United States Patent
Ueda et al.

[19]

[11] Patent Number: 6,094,337
[45] Date of Patent: Jul. 25, 2000

[54] POLYPROPYLENE FILM AND CAPACITOR MADE BY USING IT AS A DIELECTRIC

[75] Inventors: Takashi Ueda; Itsuo Nagai; Shigeru Tanaka, all of Shiga; Takumi Hirano, Shizuoka, all of Japan

[73] Assignee: Toray Industries Inc., Japan

[21] Appl. No.: 09/029,703

[22] PCT Filed: Aug. 8, 1997

[86] PCT No.: PCT/JP97/02791

§ 371 Date: Mar. 6, 1998

§ 102(e) Date: Mar. 6, 1998

[87] PCT Pub. No.: WO98/06776

PCT Pub. Date: Feb. 19, 1998

[30] Foreign Application Priority Data

| Aug. 9, 1996 | [JP] | Japan | 8-211286 |
| Oct. 4, 1996 | [JP] | Japan | 8-264889 |
| May 12, 1997 | [JP] | Japan | 9-120865 |
| May 16, 1997 | [JP] | Japan | 9-127043 |

[51] Int. Cl.[7] ................................. H01G 4/26
[52] U.S. Cl. ........................................ 361/311
[58] Field of Search .................. 361/311, 312, 361/313, 314, 315, 326, 327, 319, 323, 512, 524, 530; 428/141, 220, 461, 910, 500

[56] References Cited

U.S. PATENT DOCUMENTS

5,724,222  3/1998  Hirane et al. .................... 361/311

*Primary Examiner*—Kristine Kincaid
*Assistant Examiner*—Anthony Dinkins
*Attorney, Agent, or Firm*—Austin R. Miller

[57] ABSTRACT

Biaxially oriented polypropylene film excellent in heat resistance and long-term dielectric properties at high temperatures, reduced insulation defects, and excellent impregnation of insulating oil into the clearance between film layers and swelling resistance when immersed in the insulating oil; in a capacitor having excellent heat resistance, dielectric properties, corona resistance, long-term thermal durability and electric current resistance, with the polypropylene film serving as dielectric; the film is a biaxially oriented polypropylene film characterized by 98 to 99.5% isotacticity, 99% or more in isotactic pentad fraction, 30 ppm or less in ash content and 0.01 to 0.4 $\mu$m in center line average surface roughnesses on both sides.

19 Claims, 1 Drawing Sheet

POLYPROPYLENE FILM AND CAPACITOR MADE BY USING IT AS A DIELECTRIC

TECHNICAL FIELD

The present invention relates to a biaxially oriented polypropylene film and a capactor using it as a dielectric, particularly a biaxially oriented polypropylene film excellent in hear resistance and dielectric properties, lesser insulation defects, and excellent for impregnation of an insulating oil into the clearances between film layers, and in swelling resistance when immersed in insulating oil, and a capacitor having excellent dielectric properties, corona resistance, long-term thermal durability and electric current resistance, using the film as dielectric.

BACKGROUND ARTS

Biaxially oriented polypropylene films are widely used for packaging, tapes and capacitors, since they are excellent in optical properties such as clarity and gloss, mechanical properties such as tensile strength and elongation, moisture barrier properties and electrical properties. The biaxial orientation of film is conventionally achieved by drawing the film lengthwise (the "machine direction") and then, with a tenter, drawing the film in a direction normal to the machine direction, in the "transverse direction."Biaxially oriented polypropylene films are major materials used as dielectrics of film capacitors, but since they are lower in heat resistance as compared to polyester film, another major material, the capacitors obtained by using them are limited to about 85° C. in maximum operating temperature. As for the cause, if the operating temperature becomes high, the dielectric strength peculiar to the polypropylene films drastically declines due to the influence of the amorphous domains of the film and impurities, particularly making them unable to withstand long-term use in some cases.

On the other hand, as electric apparatuses are being downsized, devices are assembled at higher densities and exposed to higher temperatures, and there is a strong demand to use conventional polypropylene film capacitors at higher operating temperatures. Especially for capacitors intended to be mounted on AC circuits, polypropylene films with a feature of small dielectric loss have been used as dielectrics for the necessity of inhibiting heat generation from inside the capacitor devices, but since the temperature of the environment surrounding AC circuits becomes higher, it is now difficult to use polypropylene films for such an application. This is one of the factors tending to inhibit the downsizing of electric apparatuses equipped with polypropylene film capacitors. As for the reason, even when a circuit has been positioned certain distance away from the heat source, or insulated from the heat source by a heat insulator lest the circuit should be heated by the heat source, there is an increasing demand to install such a circuit very close to a heat source without using any heat insulators, to meet the demand for downsizing. This demand is typically seen for the AC circuits used in the illumination stabilizers of street lighting, etc. and the control circuits of motors. To meet this demand, it is necessary that the polypropylene film maintains its performance even at temperatures higher than 85° C., the maximum operating temperature of conventional polypropylene film capacitors, for a longer period of time.

So, polypropylene film used as a dielectric is demanded to be (1) moderately small in mechanical deformation, i.e., heat shrinkage when rapidly heated within a short time, (2) excellent in electrical properties at a high temperatures and (3) small in decline of electrical properties at high temperatures with the lapse of time.

As for the reason for requirement (1), when a capacitor device is produced, the polypropylene film wound with an electrode is generally annealed at a certain temperature, and thereby moderately thermally shrunken for tightening the winding to maintain its shape and to squeeze out the air between film layers, and in this case if the heat shrinkage is too large, the device may be deformed, lowering the capacity of the capacitor, or may be destroyed. If the heat shrinkage is too small, the tightening of the winding may be insufficient, or the dielectric loss may increase to destroy the device when used at a high temperature for a long time.

It is sometimes practiced to impregnate the capacity device with an insulating oil, for inhibiting the corona otherwise generated, the capacity decline and dielectric breakdown of the capacitor in continuous use and the increase of leak current. In such impregnation with an insulating oil, (4) it is necessary to design the film surface and (5) it is necessary to inhibit the dimensional change and swelling caused by the insulating oil, in order to ensure that the insulating oil is uniformly impregnated into the clearances between film layers when the polypropylene film used as a dielectric is wound as a capacitor device.

Furthermore, while the improvement of above mentioned properties is desired to allow the downsizing of electric apparatuses as described above, there is also a more intensive demand for further downsizing the capacitor itself. For this purpose, the electrostatic capacity of the capacitor per unit volume must be increased, and the film as the dielectric must be thinned. This requires the film to have a higher dielectric strength even at room temperature for meeting the above mentioned demand for a thinner film, though the film has been conventionally designed to be thicker to provide an allowance in dielectric properties.

Especially a capacitor intended for a high frequency circuit, using a polypropylene film as dielectric, is required to have higher dielectric properties and electric current resistance.

To solve the problem, Japanese Patent Laid-Open (Kokai) No. 6-236709 discloses a high molecular insulating material low in ash content, of 1 to 10 wt % in boiling n-heptane soluble content, hence excellent in processability, and excellent in dielectric properties in a temperature range from room temperature to 80° C., and it is stated that a material of 90% or more in the isotactic pentad fraction of the boiling n-heptane insoluble portion is preferable.

Japanese Patent Laid-Open (Kokai) No. 7-25946 proposes a propylene polymer of 80 wt % or more, especially preferably 96 wt % or more in boiling heptane insoluble content and 0.970 to 0.995 in the isotactic pentad fraction of the boiling heptane insoluble component, and also proposes a molding obtained by using the polymer.

However, biaxially oriented polypropylene films that are simply high in the isotactic pentad fraction of the boiling n-heptane insoluble portion, as proposed there, are insufficient in dielectric properties at temperatures higher than 85° C. as intended in the present invention, and also in long-term heat resistance of the capacitor device using the film as a dielectric. That is, though the biaxially oriented polypropylene films high in stereoregularity obtained by said conventional techniques are also high in the isotactic pentad fraction of the boiling n-heptane insoluble portion, the isotactic pentad fraction as a film is destined to be low since the isotactic pentad fraction of the n-heptane soluble portion is low. As a result, the stereoregularity is insufficient. In addition, a so-called high crystalline biaxially oriented polypropylene film very high in isotacticity is very poor in film formability since it is insufficient in stereoregularity, and no industrially useful technique has been established to produce a biaxially oriented polypropylene film that is excellent in bot heat resistance and dielectric properties.

As a technique to overcome this disadvantage, Japanese Patent Publication (Kokoku) No. 4-28727 proposes a crystalline polypropylene film excellent in moldability by keeping the isotactic pentad fraction in a range of 0.960 to 0.990 and keeping the total amount of the extracts obtained by sequentially extracting with boiling n-hexane and boiling n-heptane in a range of 3.0 to 6.0%. However, the film is insufficient in isotactic pentad fraction as well as in dielectric properties at high temperatures.

Furthermore, Japanese Patent Laid-Open (Kokai) No. 5-217799 proposes a metallized film capacitor using a high-modulus metallized film obtained by vapor-depositing a metal on a high-modulus polypropylene film with a specific thermal deformation temperature and a specific Young's modulus, and high in crystallinity and good in stereoregularity. However, its stereoregularity is only about 90% at the highest, and the dielectric properties at high temperatures are insufficient.

Moreover, Japanese Patent Laid-Open (Kokai) No. 7-50224 proposes a metallized polypropylene film of 4.0% or less in heat shrinkage at 120° C. in the machine direction and 0.8% or less in the transverse direction. However, the film is at the conventional levels in isotacticity and stereoregularity, and cannot be said to be sufficient in dielectric properties at the high temperatures intended in the present invention, or to meet the-advanced demand in future.

DISCLOSURE OF THE INVENTION

We have found that if the polypropylene film is highly controlled in isotacticity and stereoregularity, a polypropylene film with very high isotacticity can be formed, that if proper film forming conditions are adopted, the dielectric properties peculiar to a polypropylene film can be further improved, though this cannot be achieved by the conventional techniques, and furthermore that the capacitor obtained using the film is restrained against decline of its properties at high temperatures or long-term deterioration at high temperatures, and is small in the dispersion of quality. Thus, the present invention has been completed.

An object of the present invention is to provide a polypropylene film having excellent heat resistance and long-term dielectric properties at high temperatures and at room temperature, has less insulation defects, and is excellent in quality after impregnation of insulating oil into the clearance between film layers, and in swelling resistance when immersed in the insulating oil.

Another object of the present invention is to provide a capacitor excellent in heat resistance, long-term dielectric properties at high temperatures and room temperature, corona resistance and electric current resistance, using said polypropylene film as a dielectric.

The above objects of the present invention can be achieved by providing a biaxially oriented polypropylene film, characterized by being 98 to 99.5% in isotacticity, 99% or more in isotactic pentad fraction, and 30 ppm or less in ash content, said film having surface roughness of 0.01 to 0.4 µm measured as center line average surface roughnesses on both sides of the film. A capacitor using the polypropylene film of the present invention, having such surface roughnesses, as its dielectric, can be suitably used as a capacitor for a heat resistant AC circuit, a capacitor for a high frequency circuit or a capacitor for a heat resistant DC circuit.

BRIEF DESCRIPTION OF THE DRAWINGS

In the drawings, symbol 1 denotes a metallic layer (internal electrode); 2, an insulation groove (margin); 3, insulation grooves (to separate the internal electrode like isles); and 4, bottle necks (safety function portions), respectively.

THE MOST PREFERRED EMBODIMENTS OF THE INVENTION

The polypropylene used for the polypropylene film of the present invention is mainly propylene homopolymer, but as long as the objects of the present invention are not impaired, a comonomer such as one with another unsaturated hydrocarbon, etc. can also be copolymerized, or another copolymer of propylene can also be blended.

The monomers which constitute the copolymers and blends include, for example, ethylene, propylene (in the case of a blend with another copolymer), 1-butene, 1-pentene, 3-methylpentene-1, 3-methylbutene-1, 1-hexene, 4-methylpentene-1, 5-ethylhexene-1, 1-octene, 1-decene, 1-dodecene, vinylcyclohexene, styrene, allylbenzene, cyclopentene, norbornene, 5-methyl-2-norbornene, etc. As for the amount, in view of dielectric properties and heat resistance, the amount of the comonomer to be copolymerized is preferably less than 1 mol %, and the amount of another copolymer to be blended is preferably less than 10 wt %.

In the present invention, the isotacticity of the polypropylene film must be 99.5% or less in view of film formability.

The isotacticity in this case is defined as the weight percent of the insoluble portion of the film after extraction in boiling n-heptane, based on the weight of the film before extraction. If the isotacticity is too high, strechability is so low as to make film formation very difficult when a biaxially oriented film is produced, as described in Japanese Patent Laid-Open (Kokai) No. 6-236709. Furthermore, for the sake of heat resistance and dielectric properties, the isotacticity must be 98% or more.

For good film formability, heat resistance and dielectric properties, the isotacticity is preferably 98.5 to 99.5%, more preferably 98.7 to 99.3%.

To obtain a polypropylene film having such isotacticity, for example, the polypropylene resin selected as the raw material should be low in content of low molecular weight components and moderately low in the amount of the so-called atactic portion likely to be soluble in boiling n-heptane.

In the present invention, the stereoregularity of a polypropylene film can be evaluated in terms of the pentad fraction determined from the methyl absorption peak measured by $^{13}$C-NMR. In general, the conformations of the five repeating units (pentad) in a polypropylene molecular chain include mmmm, mmmr, rmmmr . . . rrrr, mrrr, mrrm, where m denotes the meso conformation and r the rasemo conformation. To obtain the pentad fraction of a polypropylene film, the proportions of the segments with the above respective conformations can be determined from $^{13}$C-NMR, as reported, for example, by T.Hayashi et al. (Polmer, 29, 138–143 (1988)]. Of these proportions, the fraction of the conformation of mmmm to the absorption intensity of all the methyl groups, i.e., the isotactic pentad fraction (hereinafter may be simply expressed as mmmm) can be defined as the sum of three heptad fractions of m(mmmm)m,.m(mmmm)r and r(mmmm)r.

The isotactic pentad fraction mmmm of the polypropylene film of the present invention is 99% or more. Since such a film is made of polypropylene constituted by molecules with very long isotactic segments, it can provide a film that has high crystallinity, high heat resistance and excellent dielectric properties. The mmmm value of the polypropylene film of the present invention is preferably 99.1% or more, more preferably 99.2% or more, further more preferably 99.3% or more, achieving high heat resistance and excellent dielectric properties. To secure such stereoregularity, it is effective to highly control the stereoregularity of the polypropylene resin used as the raw material. Such a raw material can be produced by selecting the catalyst system (a solid catalyst and an external electron donor compound) and controlling the purities of the components of the catalyst system. If the polypropylene resin used as the raw material is higher in mmmm value, the polypropylene film obtained tends to be higher in mmmm value, but since the extreme thermal deterioration in the extrusion system of the raw material lowers the amount of mmmmm, the structural design and extrusion conditions should be selected, for example, to avoid the long-time stagnation of the raw material in the high temperature extrusion system.

In the polymerization process of the polypropylene used for the polypropylene film of the present invention, it is usual to use a metal-containing compound as a catalyst and, as required, to remove the residue after completion of polymerization. The residue can be evaluated by measuring the amount of the metal oxide remaining after perfectly burning the resin. This is called the ash content.

The ash content of the polypropylene film of the present invention must be 30 ppm or less, preferably 25 ppm or less, more preferably 26 ppm or less. If the ash content is more than 30 ppm, the dielectric properties of the film decline, and the dielectric properties of the capacitor obtained by using the film also decline. To keep the ash content in this range, it is important to use a catalyst having low residue, but it also can be adopted to decrease the contamination from the extrusion system at the time of film formation as far as possible, for example, by bleeding for more than 1 hour.

The polypropylene used for the polypropylene film of the present invention can contain known additives, for example, a nucleating agent, antioxidant, thermal stabilizer, slip agent, antistatic agent, anti-blocking agent, filler, viscosity improver, anti-coloring agent, etc. as long as the properties of the present invention are not impaired.

Among these additives, the selection of the antioxidant used and its amount are important for long-term heat resistance. The antioxidant added to the polypropylene film of the present invention includes phenolic ones with large steric hindrance, and at least one of the antioxidants used is preferably a high polymer of 500 or more in molecular weight to minimize the volatile loss at the time of melt extrusion.

Various antioxidants are available, and it is preferable, for example, to use 2,6-di-t-butyl-p-cresol (BHT: 220.4 in molecular weight) together with 1,3,5-trimethyl-2,4,6-tris (3,5-di-t-butyl-4-hydroxybenzyl) benzene (e.g., Irganox 1330 produced by Ciba Geigy; 775.2 in molecular weight) or tetrakis [methylene-3 (3,5-di-t-butyl-4-hydroxyphenyl) propionate] methane (e.g., Irganox 1010 produced by Ciba Geigy; 1177.7 in molecular weight), etc. The total content of the antioxidants is preferably 0.03 to 1.0 wt % (300 to 10000 ppm) based on the total amount of polypropylene. If less than 0.03 wt %, the long-term heat resistance may be poor, and if more than 1.0 wt %, these antioxidants may bleed out, to cause blocking at high temperatures, adversely affecting the capacitor device. The antioxidant content is more preferably 0.1 to 0.9 wt %, further more preferably 0.2 to 0.8 wt %.

As for antioxidants, it is preferable, for long-term durability of the capacitor using the polypropylene film as its dielectric, that 2,6-di-t-butyl-p-cresol (BHT; 220.4 in molecular weight) showing better electrical properties is used together with 1,3,5-trimethyl-2,4,6-tris (3,5-di-t-butyl-4-hydroxybenzyl) benzene (e.g., Irganox 1330 produced by Ciba Geigy; 775.2 in molecular weight) and/or tetrakis [methylene-3 (3,5-di-t-butyl-4-hydroxyphenyl) propionate] methane (e.g., Irganox 1010 produced by Ciba Geigy; 1177.7 in molecular weight) by 0.05 to 0.35 wt % in total.

The addition of a nucleating agent affects the surface roughness and clarity of the film, but tends to worsen the dielectric strength. So, its content is preferably less than 0.1 wt %, and more preferably it is not substantially present.

In the present invention, the intrinsic viscosity of the polypropylene having excellent stereoregularity used for the polypropylene film is not especially limited, but is preferably 1 to 10 dl/g for the sake of film formability. Furthermore, the melt flow rate at a load of 2.16 kg at 230° C. is preferably 2 to 5 g/10 min for the sake of film formability. The intrinsic viscosity and the melt flow rate can be kept in the above ranges, for example, by controlling the average molecular weight and the molecular weight distribution.

The polypropylene film of the present invention can be obtained by biaxially orienting the raw material destined to have the above mentioned properties. If the film is not oriented, a film having high crystallinity, high heat resistance and high dielectric properties as intended in the present invention cannot be obtained. The biaxial orienting method can be any of simultaneous biaxial drawing by inflation, simultaneous biaxial drawing by a stenter or sequential biaxial drawing by stenters. Among them, for film forming stability, uniform thickness and control of the surface roughnesses described later, sequential biaxial drawing by stenters can be preferably used for film formation.

In the present invention, the center line average surface roughnesses on both surfaces of the biaxially oriented polypropylene film must be 0.01 to 0.4 μm. If the center line average surface roughnesses are too large, air remains at the clearance between stacked film layers, which deteriorates the capacitor device, and when a metallic layer is formed on the film, the metal layer is damaged, lowering the dielectric strength and the device life at high temperatures, and causing insulation defects when a voltage is applied. If the center line average roughness is too small on the contrary, the film is insufficiently slippery, which inconveniences handling, and when the capacitor device is impregnated with an insulating oil, the insulating oil does not uniformly impregnate the clearance spaces between the film layers, greatly changing the capacity in continuous use. The center line average surface roughnesses on both sides of the film are more preferably 0.03 to 0.3 μm, further more preferably 0.04 to 0.25 μm.

The biaxially oriented polypropylene film of the present invention has a surface roughness of preferably 0.01 to 0.5 µm, more preferably 0.02 to 0.4 µm, most preferably 0.03 to 0.3 µm when the surface roughness is expressed as the difference (Δd) of film thickness when measured by the two methods (a) measuring thickness with a micrometer and (b) measuring thickness by weight, all as defined by the following formula:

$$\Delta d = d\,(MMV) - d\,(WMV)$$

where d (MMV) is the film thickness (µm) determined by measuring 10 stacked films with a micrometer, and d (WMV) is the thickness of those films by weight (µm).

If Δd is more than 0.5 µm, the roughnesses on the film surfaces form substantial clearances between wound or stacked film layers of the capacitor, and the clearances may induce corona discharge at the electrode ends, decreasing dielectric strength and also decreasing electrostatic capacity. If Δd is less than 0.01 µm, the film may have insulation defects caused by electrostatic discharge when the film is unwound from the film roll, since the contact area between the film layers is great.

Furthermore, the maximum roughnesses (Rt) on both sides of the biaxially oriented polypropylene film of the present invention are preferably 0.1 to 4.0 µm, more preferably 0.3 to 3.0 µm. If the maximum roughnesses are less than 0.1 µm, slipperiness is insufficient, and air can only insufficiently escape, forming longitudinal creases, etc., and windability and handling convenience may be decreased. On the other hand, if the Rt values are more than 4.0 µm, the surfaces are too rough, and air remains in the clearances between the stacked film layers, deteriorating the capacitor device, and the film may be broken, lowering productivity.

In the present invention, the crystallinity obtained from the density of the biaxially oriented polypropylene film is preferably 70% or more, more preferably 72% or more, further more preferably 74% or more. If the crystallinity is less than 70%, the biaxially oriented polypropylene film may decline in heat resistance, dielectric properties and metallizability.

The biaxially oriented polypropylene film of the present invention is preferably 1.5 to 3.5% in the sum of heat shrinkage in the machine and transverse directions when heated at 120° C. for 15 minutes. If the sum of heat shrinkage is too large, dimensional change may act to crease the film roll when a metallic layer is formed as an electrode, and the inside of the film and/or the portion in contact with an external electrode may become stressed because of too much mechanical deformation caused when the capacitor device is produced, greatly lowering capacity of the capacitor, or destroying the device. If the sum of heat shrinkage percentages is too small, the winding tightening by heat treatment when the capacitor device is produced is insufficient, adversely affecting the form integrity and the capacity change rate. The sum of heat shrinkage is more preferably 1.6 to 3.3%, further more preferably 1.7 to 3.0%, still further more preferably 1.8 to 2.8%, especially preferably 1.8 to 2.5%.

Especially when the metallized layer is changed in thickness in the transverse direction of the film, described later, to increase the thickness of the layer portion in contact with an external electrode, the film roll has portions that are different in metallized layer thickness formed in stripes along the machine direction of the film. So, if the heat shrinkage is large, the film roll is greatly creased, and in the processing of a capacitor device, the slit edge face may not be aligned, making the connection with the external electrode insufficient, lowering electric current resistance as a problem in actual use.

In the present invention, the thickness of the biaxially oriented polypropylene film (the film thickness determined by measuring 10 stacked films using a micrometer) is preferably 2.0 to 30 µm, more preferably 2.5 to 20 µm in view of film formability, mechanical properties and electrical properties. If the film thickness is too small, the dielectric strength and mechanical strength may become insufficient, and the film may be damaged by metallization, especially by heat. If the thickness of the film is too large, it is difficult to form a film with a uniform thickness, and when the film is used as the dielectric of a capacitor, the capacity per unit volume becomes too small.

The thickness of the film is selected to suit the application concerned, considering whether the power source is DC or AC, the working voltage, and the size and capacity of the capacitor. For a capacitor used in AC, especially for an AC circuit required to have high heat resistance, the film thickness is preferably 3 to 10 µm. On the other hand, for a capacitor used in DC, especially for a high frequency circuit used with a large current, that is, for an application where electric current resistance is required, the thickness is preferably 3 to 10 µm, and especially when high dielectric strength is required, the thickness is preferably 5 to 15 µm. For a DC circuit required to have high heat resistance, the thickness is preferably 3 to 15 µm, and for electric power uses, the thickness is preferably 15 to 25 µm.

The biaxially oriented polypropylene film of the present invention has preferably 5 to 12% weight change rate when immersed in dodecylbenzene. The weight change rate corresponds to the swellability of the film. If the weight change rate exceeds 12%, the film is swollen greatly at the device ends through which an insulating oil can be impregnated. This chokes the moderate clearance between the film layers, preventing the insulating oil from impregnating deep inside the device, not allowing the effect of the insulating oil to cause corona resistance to be sufficiently manifested, and the swelling may excessively stress the film used as the dielectric of the capacitor device, lowering the dielectric strength. If the weight change is less than 5%, since the affinity between the film surface and the insulating oil declines, the rate of the insulating oil impregnation into the clearance between the film layers declines, making it unlikely that the insulating oil will uniformly fill the device internally, the ability of the insulating oil to give corona resistance may not be able to manifest itself sufficiently. The weight change rate is more preferably 6 to 11%, most preferably 7 to 11%.

The biaxially oriented polypropylene film of the present invention preferably has a -1 to 1% dimension change rate along the machine direction of the film when immersed in dodecylbenzene. If the dimension change rate in the machine direction of the film exceeds 1%, winding tightening occurs when the capacitor device is impregnated with an insulating oil, choking the moderate clearance formed between film layers, to inhibit the insulating oil against being impregnated deep inside the device, and reducing the effect of the insulating oil to give corona resistance. If the dimension change rate in the machine direction of the film is less than −1% (e.g., −2%, −3%, etc.), the film is partially deflected inside the capacitor device, and the dielectric loss may be worsened. The dimension change rate in the machine direction of the film is more preferably −0.8 to 0.8%, most preferably −0.6 to 0.6%.

The biaxially oriented polypropylene film of the present invention has preferably −2 to 2% dimension change rate in the transverse direction of the film when immersed in dodecylbenzene. If the dimension change rate in the transverse direction of the film exceeds 2%, the contact with a sprayed metal may fail, to worsen the dielectric loss. If the dimension change rate in the transverse direction of the film is less than −2% (i.e., 3%, −4%, etc.), the film may be partially deflected inside the capacitor device, also to worsen the dielectric loss. The dimension change rate in the transverse direction of the film is more preferably −1.5 to 1.5%, most preferably −1 to 1%.

Furthermore, the biaxially oriented polypropylene film of the present invention has preferably 20 minutes or more of oxygen absorption induction time, since the long-term durability of the capacitor using the polypropylene film as its dielectric is good.

Moreover, the biaxially oriented polypropylene film of the present invention has $1.5 \times 10^5$ ΩF or more insulation resistance IR1 at 20° C., and 700 or less in IR1/IR2 where IR2 is the insulation resistance at 100° C., when using it as the dielectric of a capacitor. This is especially suitably used for a capacitor for a heat resistant DC circuit. It is more preferable that IR1 is $2 \times 10^5$ Ω or more, and that IR1/IR2 is 500 or less. If IR1 is less than $1.5 \times 10^5$ ΩF, or if IR1/IR2 exceeds 700, the dielectric properties may decline when the capacitor is used for a long time.

If a metallic layer is formed on the biaxially oriented polypropylene film of the present invention, the surface on which the metallic layer is formed is preferably treated by corona discharge or plasma for enhancing the adhesive strength. The corona discharge treatment can be carried out using any publicly known method, but the atmospheric gas of the treatment is preferably air, carbon dioxide gas, nitrogen gas or any of their mixtures. The plasma treatment can be carried out by keeping any of various gases in a plasma state for chemical modification of the film surface, and for example, the method described in Japanese Patent Laid-Open (Kokai) No. 59-98140 can be used.

The biaxially oriented polypropylene film used as the dielectric of a capacitor in the present invention can be wound together with a metallic foil used as an electrode, or can be metallized beforehand to have an electrode. For downsizing the capacitor device, a polypropylene film metallized and wound is more preferable.

When a metallic layer is formed on the biaxially oriented polypropylene film of the present invention, the metal is not especially limited, but the use of one or more in combination of aluminum, zinc, copper, tin, silver, nickel, etc. is preferable for the durability of the metallic layer, and productivity. If a metal mainly composed of aluminum or zinc is used, an additional effect can be obtained. In the case of aluminum, the self heal properties of the capacitor at a time of dielectric breakdown is improved preferably as an additional effect, and in the case of zinc, the capacitor can have corona resistance, preferably. In this case, reference to the metal as a main ingredient means that it accounts for 50 wt % of the metals forming the metallic layer. As a preferable method for determining the contents of the individual metals actually constituting the metallic layer, at first, a certain amount of a metallic layer is dissolved in hydrochloric acid, and the contents of individual metals are determined by using a plasma emission spectrometer (ICP).

If a metallic layer is formed on the biaxially oriented polypropylene film of the present invention to be used as a capacitor for AC, the metallic layer is preferably mainly composed of zinc in view of preference for corona resistance of the capacitor. If the metallic layer mainly composed of zinc is an alloy using aluminum as a metal other than zinc, the corona resistance obtained is more preferably compatible with the moderate self heal properties of the capacitor at the time of dielectric breakdown. When an alloy of zinc and aluminum is used, it is most preferable that the zinc content is 80 wt % to 95 wt % while the aluminum content is 5 wt % to 20 wt %.

On the other hand, if a metallic layer is formed on the biaxially oriented polypropylene film of the present invention to be used for a capacitor for DC, the metallic layer is preferably mainly composed of aluminum, in view of the preference for improving the self heal properties of the capacitor at the time of dielectric breakdown.

The method for forming a metallic layer on the biaxially oriented polypropylene film of the present invention can be vacuum metallization, sputtering or ion beam method, etc. but is not especially limited.

In the present invention, the metallic layer resistance of the metallized film is preferably 1 Ω/square to 40 Ω/square, more preferably 1.2 Ω/square to 30 Ω/square. If the resistance is too small, the thickness of the metallized layer is excessive, and at the time of metallization, heat damage is caused to form surface defects like craters. Furthermore, if the film is as thin as about 4 gm, holes, etc. may be formed. If the resistance is too large, the dielectric loss is worsened, and the heat generated from inside the capacitor with AC applied may not allow the long-term voltage withstand to be maintained. The layer resistance can be kept in this range preferably by monitoring the resistance of the metallic layer during metallization, to control it.

Furthermore, in the present invention, when the capacitor obtained by using the biaxially oriented polypropylene film as it s dielectric is used for a heat resistant AC circuit or for a high frequency circuit in a DC circuit or for any application requiring heat resistance, the resistance value is preferably 2 Ω/square to 10 Ω/square for the reasons as mentioned above.

Moreover, in the present invention, when the capacitor obtained by using the biaxially oriented polypropylene film as its dielectric is used especially for a high frequency circuit in a DC circuit, it is preferable that the resistance of the metallic layer changes continuously in the transverse direction of the film, that is, lowest in the portion in contact with an external electrode and highest near the insulation groove, i.e., the portion to be substantially an internal electrode beyond the film dielectric. Specifically, it is preferable to form a metallic layer continuously changing in resistance in a range from minimum 2 Ω/square to maximum 10 Ω/square in the transverse direction of the film. This constitution can be achieved, for example, by placing a comb-shaped deposition. preventive plate extending in the running direction of the base film between the base film and the metallization source at the time of metallization, to change the intensity of the flux of the deposited metal in the transverse direction of the film.

The film contains potential insulation defects introduced from the raw material and in the step of film formation. So, in the production of the capacitor, a step called clearing is generally taken to inactivate the insulation defects by voltage treatment. As for the mechanism of clearing, the Joule heat from the dielectric breakdown at an insulation defect evaporates the metal electrode around it, and electrically isolates the discharge breakdown portion from the other portion of the electrode. Since the Joule heat is constant irrespective of the deposited metal and metallic layer thickness, the likelihood for the metal electrode to evaporate affects the clearing (self heal properties), and especially when the thickness of the electrode layer is smaller, the metal electrode of the nearby portions of the insulation defects is perfectly evaporated to allow perfect clearing, preferably.

If this clearing is imperfect, dielectric breakdown may be caused, especially when a high voltage is applied. Especially when the capacitor is used at a high voltage in a high frequency circuit, the thickness of the electrode layer must be kept small for the above reason, but as a whole, if the thickness is kept small, the portion in contact with an external electrode must be inevitably small in layer thickness, to make the contact with the external electrode insufficient. As a result, the dielectric loss of the capacitor may become large. To avoid that, it is preferable that the internal electrode portion is small in layer thickness and the portions in contact with the external electrode are large in layer thickness.

In the present invention, if a metallic layer is formed on either side of the biaxially oriented polypropylene film when there is a difference between both the sides of the film in center line average surface roughness, it is preferable to form the metallic layer on the side that has smaller surface roughness. In this case, the surface defects of the metallic layer can be minimized, improving the dielectric strength and the device life.

In the present invention, the insulation groove (a portion free from the metallic layer provided on the side where the metallic layer is formed, for the purpose of electric insulation, etc.) provided when the metallic layer is formed on the biaxially oriented polypropylene film can be of an ordinary type, but can also be of any of various types, for example, with a fuse mechanism to suit each object. However, especially, it is preferable that the metallic layer serving as an internal electrode has an insulation groove formed continuously in the machine direction of the film at one edge in the transverse direction of the film, and that the internal electrode is provided with such a safety function that the current flowing, when the film suffers a dielectric breakdown, electrically insulates the internal electrode portion around the discharge breakdown point from the other internal electrode portion free from any discharge caused, since the capacity change after continuous use of the capacitor can be minimized.

It is also preferable that the metallic layer serving as an internal electrode is formed with an insulation groove provided continuously in the machine direction of the film at one edge in the transverse direction of the film, and that such a safety function that the current flowing when the film suffers a dielectric breakdown electrically insulates the internal electrode portion around the discharge breakdown point from the other internal electrode portion free from any discharge caused is provided in such a manner that the metallic layer is separated into a plurality of isles arranged in the machine direction of the film by insulation grooves, and is connected through bottlenecks with a metallic layer that is continuous at the other edge in the transverse direction of the film, since the dielectric loss is less increased, and since the capacity change after continuous use of the capacitor can be minimized. This constitution can be especially preferably used in a capacitor for a he at resistant AC circuit.

Moreover, it is preferable that the metallic layer serving as an internal electrode is formed with an insulation groove provided continuously along the machine direction of the film at one edge in the transverse direction of the film, and that the internal electrode is provided with a plurality of such safety functions in the transverse direction of the film that the current flowing when the film suffers a dielectric breakdown electrically insulates the internal electrode portion around the discharge breakdown point from the other internal electrode portion, free from any discharge caused, since the capacity change after continuous use of the capacity can be most efficiently inhibited though the layer resistance of the internal electrode becomes large to worsen the dielectric loss. This constitution can be especially preferably used in a capacitor for a heat resistant DC circuit.

The method for forming the insulation groove is not limited. It can be the laser margin method, oil margin method, etc., and the simple oil margin method can be preferably used.

In the present invention, the capacitor with metallic layers formed on biaxially oriented polypropylene films can be of the type in which two films with a metallic layer (with a margin) on one side respectively are used as a pair, and wound together, and in which the pair of metallic layers are connected to two external lead electrodes without causing shortcircuiting, or of the type in which a film with metallic layers (with a margin each) on both sides is wound together with one or more films not provided with any metallic layer, and in which the pair of metallic layers are connected with two lead electrodes without causing shortcircuiting. However, the type of the capacitor is not limited to these. In this case, it is preferable to connect the metallic layers provided on the films with the external lead electrodes by metal spraying.

Furthermore, in the present invention, the capacitor with metallic layers having safety functions with bottlenecks formed on biaxially oriented polypropylene films is not especially limited in type, but if two metallic layers as a pair have bottlenecks respectively, irrespective of whether the two metallic layers are provided on either of each film or on both sides of a film, the capacity change after continuous use of the capacitor can be kept at a minimum.

The types of capacitors which can be adopted as the capacitor ofthe present invention include the dry type, oil impregnated type, etc., and can be selectively adopted for various purposes. For a capacitor for an AC circuit, the oil impregnated type can be preferably used.

The insulating oil used for an oil impregnated type capacitor is not especially limited, and can be one or more of vegetable oils, mineral oils, waxes, etc. As required, a viscosity improver, etc. can also be included.

The film capacitor using the biaxially oriented polypropylene film of the present invention as its dielectric is preferably 200 V/$\mu$m or more per unit thickness in AC dielectric strength at 105° C. The reason is that while the rated AC voltage of a polypropylene film capacitor is usually 45 to 50 V/$\mu$m, a value of more than 4 times the voltage is preferable for safety. The AC dielectric strength is more preferably 210 V/$\mu$m or more. To keep the dielectric strength of a film capacitor in this range, it is effective to avoid creases and flaws in the processing into the capacitor.

The film capacitor using the biaxially oriented polypropylene film of the present invention as its dielectric is preferably 350 V/$\mu$m or more per unit thickness in DC dielectric strength at 25° C. (room temperature). The reason is that while the rated DC voltage of a polypropylene film capacitor is usually 65 to 75/V $\mu$m, a value of more than 4 times the voltage is preferable for safety. The DC dielectric strength is more preferably 370 V/$\mu$m or more. To keep the dielectric strength of a film capacitor in this range, it is effective to avoid creases and flaws in the processing into the capacitor.

The life of the film capacitor using the biaxially oriented polypropylene film of the present invention as its dielectric with an AC voltage of 60 V/$\mu$m per unit thickness (1.2 to 1.3 times the rated voltage) applied at 105° C. is preferably 500 hours or more, more preferably 1000 hours or more in view of the guarantee period of the apparatus mounted with the capacitor. To keep the life in this range, it is effective to add a proper amount of an antioxidant, to heat-treat at about 100° C. in the processing into the capacitor, to avoid creases and flaws in the processing into the capacitor, and to mold the capacitor in an epoxy resin or to seal the capacitor in a metallic can after impregnating it with an oil (outerpackage), for preventing contact with the open air.

Methods for producing the biaxially oriented polypropylene film of the present invention and the capacitor using the film as its dielectric are described below, but the present invention is not limited thereto or thereby.

Raw polypropylene is supplied into an extruder, heated to be molten, filtered by a filter, and melt-extruded from a slit die at a temperature of 220 to 320° C. into a film, and the film is wound on a casting drum kept at a temperature of 50 to 85° C., to be cooled and solidified, for making a cast film. In this case, if the temperature of the casting drum is too high, the film may be crystallized so intensively as to make the subsequent drawing difficult or to make the surface roughnesses too large. If lower than 50° C., the surface roughnesses may be too small. The methods which can be used for adhering the film to the cast drum include electrostatic application, using the surface tension of water, air knife method, press roll method, submerged casting, etc., but to obtain the polypropylene film of the present invention, the air knife method is effective since it gives good flatness and allows the control of surface roughnesses. Especially the surface temperature of the film on the cast drum side can be different from that on the opposite side due to the difference between the drum surface and air in cooling efficiency, and since the polypropylene that has high stereoregularity used for the film of the present invention is high in crystallinity, the difference in surface temperature can result in a difference in crystallinity on the film surface as between both sides. This greatly affects the flatness and the difference in surface roughness between both sides. So, when the air knife method is used, it is also important to control the temperature of the blown air. To obtain the film of the present invention, it is preferable to set the temperature of the air used for the air knife method at ((Cast drum temperature)−70° C.)−((Cast drum temperature)−20° C.).

Subsequently, the cast film is biaxially drawn, to be biaxially oriented. At first, the cast film is pre-heated on rolls kept at 120 to 150° C. In succession, the film is fed between pairs of rolls kept at a temperature of 140° C. to 150° C. and different peripheral speeds, and is drawn to 2 to 6 times in the machine direction, and immediately cooled to room temperature. If a polypropylene film having 99% or more (in mmmm)of the present invention is preheated at a temperature of 130° C. or lower and drawn at a temperature of 140° C. or lower, it may be drawn irregularly and broken, not allowing film formation due to insufficient calorific value, and it is important to adopt a drawing temperature of higher than 140° C.

In succession, the drawn film is introduced into a stenter, and drawn in the transverse direction to 5 to 15 times at a temperature of 155 to 165° C., and then while it is being relaxed by 2 to 20% in the transverse direction, it is thermally fixed at a temperature of 150 to 160° C., and wound.

Subsequently, the film is treated by corona discharge in air, nitrogen, carbon dioxide gas, or any mixtures, on the surface to be metallized, to improve the adhesive strength to the metal toe deposited, and is wound by a winder.

The obtained film is placed in a vacuum metallizer, and the film is coated with an oil to form an insulation groove suitable for the purpose concerned, using a gravure coater, etc. Then, a metal suitable for the purpose concerned is deposited in an amount to achieve a predetermined layer resistance. Furthermore, as required, metallization is carried out through a comb-shaped deposition preventive plate to continuously change the resistance value in the transverse direction of the film. The metallized film is slit, to make two metallized reels as a pair for making a capacitor device. Then, the reels are wound to form a device and the device is formed flat by a thermal press, followed by metal spraying at the ends, attaching of leads, as required impregnation with an insulating oil, and packaging to make a capacitor.

The methods for measuring and evaluating the properties of components in the present invention are as described below.

(1) Isotacticity (isotactic index: II)

A sample is subjected to extraction in n-heptane at a temperature of 60° or lower for 2 hours to remove additives from the polypropylene, and dried in vacuum at 130° for 2 hours. From it, a specimen of W (mg) in weight is taken and subjected to extraction in boiling n-heptane in a Soxhlet extractor for 12 hours. The specimen is then taken out, washed sufficiently in acetone, dried in vacuum at 130° C. for 6 hours, and cooled to room temperature. The weight W' (mg) of the cooled specimen is measured, and the isotacticity is calculated from the following formula:

$$II=(W'/W)\times 100 \ (\%)$$

(2) Isotactic Pentad Fraction

A specimen is dissolved in o-dichlorobenzene, and $^{13}$C-NMR is measured at a resonance frequency of 67.93 MHZ using JNM-GX270 spectrometer produced by JEOL Ltd. The method proposed by T. Hayashi et al. (Polymer, 29, 138–143 (1988)] is used for the calculation to determine the assignment of spectral peaks and the pentad fraction. Assigning the 21.855 ppm peak to the mmmmn peak for the spectrum from the methyl group, each peak is assigned and its peak area is calculated to determine its percentage proportion relative to the total area of the peaks attributed to the methyl group. Detailed measuring conditions are as follows. Solvent used for measurement: o-dichlorobenzene (90 wt %) /benzene-D6 (10 wt %)

Specimen concentration: 15~20 wt %
Measuring temperature: 120–1300° C.
Resonance frequency: 67.93 MHZ
Pulse width: 10 μsec (45° pulse angle)
Pulse repetition time: 7.091 sec
Data points: 32 K
Number of accumulations: 8168
Measurement mode: Noise decoupling (3) Center Line Average Surface Roughness and Maximum Roughness (expressed as Ra and Rt respectively)

A tracer type surface roughness tester is used for measurement according to JIS B 0601. A high precision thin coating level difference measuring instrument (Model ET-10) produced by Kosaka Kenkyujo K. K. is used at a conical probe radius of 0.5 μmR, a load of 5 mg and a cut-off of 0.08 mm.

(4) Measurement of Δd

The thickness of a film (d (MMV) (μm)) is measured by stacked 10 films using a micrometer according to JIS B 7502. A micrometer of 700±100 gf and 0.0001 mm in minimum reading is used, and the value obtained by measuring 10 stacked films is divided by 10, to obtain d (MMV) (μm). To measure the film thickness by the gravimetric method (d (WMV) (μm)), a film is cut into a 10 cm square, and the weight W (g) is measured by an electronic force balance produced by Metler. The intended weight is obtained from the following formula:

d (WMV)=100×W/ρ

[where d (WMV) is the gravimetric thickness (μm); W, the weight of the 10 cm square film; and p is the density (g/cm$^3$) of the film. ρ is measured using ethanol-water density gravity tubes at 23±0.5° C. according to JIS K 7112 D method.]

Then, using the d (MMV) and d (WMV) obtained, Δd (μm) is calculated from the following formula:

Δd=d (MMV)-d (WMV)

(5) Heat Shrinkage

A sample measuring 260 mm and 10 mm in the machine and transverse directions respectively is taken out of a film, and marks are made at 30 mm from both the ends, to secure an original size (L0: 200 mm). A weight of 3 g is applied to the bottom end of the sample, and it is hung in an oven at 120° C., and heat-treated for 15 minutes. The sample is taken out, and the distance between the marks ($L^1$) is measured, to calculate the heat shrinkage from the following formula. The sum of calculations in the machine and transverse direction is adopted as the heat shrinkage of the sample.

Heat shrinkage=[(L0 L1)/L0]×100 (%)

(6) Ash Content

Measurement is carried out according to JIS C 2330. A biaxially oriented polypropylene film of W0 in initial weight is put in a platinum crucible, at first combusted completely by a gas burner, and then treated in an electric furnace of 750 to 800° C. for about 1 hour for perfect ashing, and the weight W1 of the obtained ash is measured. The ash content is obtained from the following formula:

Ash content=(W1/W0)×1000000 (ppm)

W0: Initial weight (g)
W1: Ash weight (g)

(7) Insulation Defect Test

A film of 7.5 μm in thickness obtained by the 10-film micrometer method according to JIS C 2330 is judged in reference to the following criterion:

| | |
|---|---|
| o | Two or less insulation defects |
| Δ | Three to five insulation defects |
| x | Six or more insulation defects (the film cannot be used for a capacitor.) |

In the present invention, a film judged to be o or Δ is acceptable.

(8) Dielectric strength of device (AC)

A capacitor device kept at 105° C. in a hot air oven is connected to an AC high voltage stabilizing power supply (frequency 60 Hz) produced by Kasuga Denki Co., Ltd., and a voltage increased at a rate of 200 V/sec is applied, to identify the voltage at which the device has been destroyed.

The average value of 10 samples is adopted as the dielectric strength of the device which is judged in reference to the following criterion:

| | |
|---|---|
| o | 200 V/μm or more |
| Δ | 150 V/μm to less than 200 V/μm |
| x | Less than 150 V/μm |

In the present invention, a device judged to be o and Δ is acceptable.

(9) Dielectric Strength of Device (DC)

A capacitor device kept at 25° C. is connected to a DC high voltage' stabilizing power supply produced by Kasuga. Denki Co., Ltd., and a voltage increased at a rate of 200 v/sec is applied to identify the voltage at which the device has been destroyed. The average value of 10 samples is adopted as the dielectric strength of the device.

(10) Device Life Test

An AC voltage of 60 V/μm (frequency 60 Hz) per film thickness is applied to a capacitor device in an atmosphere of 105° C., to measure the time until the device is destroyed. The device is judged in reference to the following criterion:

| | |
|---|---|
| o | 500 hours or more |
| Δ | 400 hours to less than 500 hours |
| x | Less than 400 hours |

In the present invention, a device judged to be o or Δ is acceptable.

(11) Weight Change Rate and Dimension Change Rate After Immersion in Dodecylbenzene A film sample is treated at 100° C. in dodecylbenzene without any load applied for 8 hours, and is naturally allowed to cool at room temperature taking 16 hours, and this cycle is repeated 3 times, to obtain the respective change rates of the film from the following formulae. In this case, two dimension change rates in the machine direction (MD) and the transverse direction (TD) of the film are measured. Each sample is measured at 5 places, and the average value is adopted.

Weight change rate (%)=(J0−J1)/J0×100

Dimensional change rate (%)=(M0−M1)/M0×100

(where J0 and J1 are the weights of the film sample before and after immersion in dodecylbenzene respectively, and M0 and M1 are the dimensions of the film sample before and after immersion in dodecylbenzene.)

(12) Evaluation of Corona Resistance

An AC voltage of 30 V/μm (frequency 60 Hz) per film thickness is applied to a capacitor device in an atmosphere of 105° C. for 500 hours, and the capacity change rate of the device is obtained from the following formula. The device is evaluated in reference to the following criterion:

Volume change rate (%)=(C1−C0)/C0×100

(where C0 is the capacity of the capacitor device before voltage application, and C1 is the capacity of the capacitor device after voltage application.)

| | |
|---|---|
| ○ | Capacity change rate < 5% |
| | Corona resistance is good. |
| Δ | 5% < Capacity change rate < 10% |
| | Corona resistance does not pose any problem. |
| x | 10% < Capacity change rate |
| | Corona resistance is insufficient. |

In the present invention, the device judged to be ○ or Δ is acceptable.

(13) Electric Current Resistance

A high frequency constant current power supply (HFS 100K-100 produced by Takasago) is used, to feed a current of 10 A to a capacitor device at 100 kHz at a voltage of 10 V for 3 minutes, and the dielectric loss of the sample is measured according to the Schering bridge method.

(14) Insulation Resistance and Self Heal Properties

The insulation resistance of a capacitor device is measured according to Electronic Industries Association of Japan Standard EIAJ RC-3666A (IR1 and RO). Then, DC 500 V is applied, and the voltage is increased in steps of DC 100 V, to be applied for 1 minute each, and the number of discharge breakdown points is observed in reference to discharge sounds. When 10 discharge breakdown points have been observed, the voltage application is stopped. The insulation resistance (R) after discharge breakdown is measured, and the device is judged in reference to the following criterion with the R/RO value as the self heal properties indicator.

| | |
|---|---|
| R/RO 1.5 or more | Self heal properties ○○ |
| R/RO 1 to less than 1.5 | Self heal properties ○ |
| R/RO 0.8 to less than 1 | Self heal properties Δ |
| R/RO Less than 0.8 | Self heal properties x |

In the present invention, a device judged to be ○○, ○ or Δ is acceptable.

(15) Resistance of Metallic Layer

A metallized film sample is cut to make a piece 2 mm in width and 50 mm in length in the machine direction, and the resistance value in the machine direction is measured according to the four-point contact method, and calibrated in reference to the width and the voltage measuring terminal distance. For a sample different in resistance in the transverse direction, the sample was measured in the entire width, to obtain the maximum and minimum values.

(16) Oxygen Absorption Induction Time

Three grams of a polypropylene film cut into pieces is placed in an oxygen atmosphere at atmospheric pressure, and heated at 184° C. The oxygen pressure is measured with the lapse of time, and the time until the pressure suddenly begins to decrease is adopted as the oxygen absorption induction time.

(17) Long-term DC Application Durability of Capacitor

A capacitor device is encased in a plastic case together with an epoxy resin used as a filler, to produce a capacitor sample. A DC voltage of 200 V/μm is applied to the capacitor sample in an atmospheric temperature of 85° C. for 1000 hours, and the numbers of insulation defects before and after voltage application are counted.

The present invention is described below in detail in reference to examples of the present invention and comparative examples.

EXAMPLE 1

Figure 1:
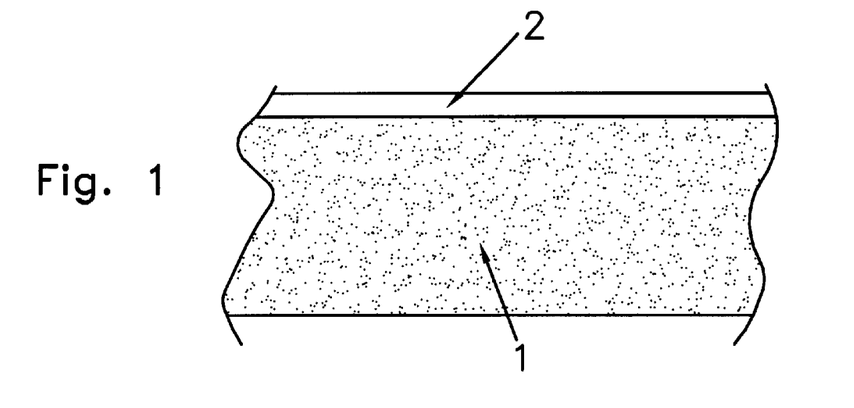
FIG. 1 is a plan view showing a polypropylene film with a metallic layer on one side, as an embodiment of the present invention.

A mixture with 3000 ppm of 2,6-di-t-butyl-p-cresol (BHT) and 4000 ppm of tetrakis [methylene-3 (3,5-di-t-butyl4-hydroxyphenyl) propionate] methane (Irganox 1010) added to raw polypropylene of 99.1% in II, 99.7% in mmmm, 21 ppm in ash content and 4.2 g/10 min in melt flow rate was supplied into an extruder, molten at a temperature of 280° C., and extrusion-molded into a sheet from a T die, and the sheet was wound on a casting drum of 80° C. using the air knife method at an air temperature of 25° C., and cooled and solidified. Then, the sheet was preheated at 143° C., and fed between pairs of rolls kept at 148° C. and having different peripheral speeds, drawn to 4.8 times in the machine direction. In succession, the film was introduced into a stenter and drawn to 11 times in the transverse direction at 161° C., and then, relaxed by 10% in the transverse direction, it was heat-treated at 150° C., to obtain a 7.50 μm thick biaxially oriented polypropylene film. Furthermore, it was treated by corona discharge in air at a treatment intensity of 30 W·min/m². The obtained film was 99.0% in II and 99.6% in mmmm. The film was placed in a vacuum metallizer, and with copper as a nucleating metal, zinc containing 8 wt % of aluminum was deposited on the corona treated surface to achieve a layer resistance of 4.0 Ω/square. The metallization was carried out by the oil margin method in such a manner that an insulation groove 2 was formed (margin; 1 mm in length in the transverse direction) at one edge in the transverse direction of the metallic layer 1, as shown in FIG. 1, after slitting.

The film was slit to obtain a metallized film of 38 mm in overall width. Two reels of the obtained film as one pair were wound to form a device, and the device was sprayed with a metal at the end faces. Leads were attached there, to produce a capacitor device of 5 μF in capacity. The evaluation results of the obtained polypropylene film and capacitor device are shown together in Table 1.

COMPARATIVE EXAMPLE 1

A polypropylene film (97.8% in II and 99.1% in mmmm) and a capacitor device was obtained as described in Example 1, except the raw polypropylene had 98.0% in II, 99.2% in mmmm, 21 ppm in ash content and 3.1 g/10 min in melt flow rate. The cast drum temperature was 85° C. The evaluation results of the obtained polypropylene film and capacitor device are shown together in Table 1.

COMPARATIVE EXAMPLE 2

The production of a polypropylene film was attempted as described in Example 1, using raw polypropylene having 99.8% in II, 99.9% in mmmm, 12 ppm in ash content and 2.4 g/10 min in melt flow rate,.but after drawing in the transverse direction, film breaking occurred frequently, not allowing the film to be obtained stably. The film which could be produced without being broken was 99.7% in II and 99.9% in mmmm.

COMPARATIVE EXAMPLE 3

A polypropylene film (98.2% in II and 98.5% in mmmm) and a capacitor device were obtained as described in Example 1, using raw polypropylene having 98.4% in II, 98.9% in mmmm, 21 ppm in ash content and 3.9 g/10 min in melt flow rate. The evaluation results of the obtained polypropylene film and capacitor device are shown together in Table I.

COMPARATIVE EXAMPLE 4

A polypropylene film (99.0% in II and 99.6% in mmmm) and a capacitor device were obtained as described in Example 1, using the same raw polypropylene as used in Example 1, except that the cast drum temperature was 90° C. The evaluation results of the obtained polypropylene film and capacitor device are shown together in Table 1.

COMPARATIVE EXAMPLE 5

A polypropylene film (99.0% and 99.6% in mmmm) and a capacitor device were obtained as described in Example 1, using the same raw polypropylene as used in Example 1, except that the cast drum temperature was 30° C. The evaluation results of the obtained polypropylene film and capacitor are shown together in Table 1.

EXAMPLE 2

A polypropylene film (99.0% in II and 99.6% in mmmm) and a capacitor device were obtained as described in Example 1, using the same raw polypropylene as used in Example 1, except that the cast drum temperature was 70° C. The evaluation results of the obtained polypropylene film and capacitor device are shown together in Table 1.

film formation, the film was curled in the transverse direction, and during transverse drawing, declipping sometimes occurred to lower the yield. The evaluation results of the obtained polypropylene film and capacitor device are shown together in Table 1.

EXAMPLE 6

A polypropylene film (98.6% in II and 99.2% in mmmm) and a capacitor device were obtained as described in Example 1, except that the raw polypropylene used was obtained by dry-blending the raw polypropylene used in Example 1 and the raw polypropylene used in Comparative Example 1 at 1:2. The evaluation results of the obtained polypropylene film and capacitor device are shown together in Table 1.

TABLE 1

|  | Example 1 | Comparative Example 1 | Comparative Example 3 | Comparative Example 4 | Comparative Example 5 | Example 2 | Example 3 | Example 4 | Example 5 | Example 6 |
|---|---|---|---|---|---|---|---|---|---|---|
| Ra($\mu$m) on drum side | 0.18 | 0.18 | 0.15 | 0.53 | 0.005 | 0.08 | 0.17 | 0.09 | 0.20 | 0.15 |
| Ra($\mu$m) on non-drum side | 0.30 | 0.21 | 0.20 | 0.38 | 0.01 | 0.08 | 0.10 | 0.14 | 0.37 | 0.18 |
| d (MMV) ($\mu$m) | 7.50 | 7.50 | 7.50 | 7.50 | 7.50 | 7.50 | 7.50 | 7.50 | 7.50 | 7.50 |
| d (WMV) ($\mu$m) | 7.22 | 7.34 | 7.43 | 6.89 | 7.50 | 7.38 | 7.09 | 7.15 | 7.02 | 7.27 |
| A d ($\mu$m) | 0.38 | 0.16 | 0.07 | 0.61 | 0.00 | 0.12 | 0.41 | 0.35 | 0.48 | 0.23 |
| Heat shrinkage (%) | 2.2 | 3.8 | 4.2 | 1.8 | 2.7 | 2.3 | 2.6 | 2.4 | 2.1 | 3.1 |
| Dielectric strength of device (V/$\mu$m) | 215 ○ | 135 x | 120 x | 95 x | 105 x | 225 ○ | 180 Δ | 190 Δ | 185 Δ | 173 Δ |
| Life of device (hours | 680 ○ | 280 x | 270 x | 180 x | 160 x | 1350 ○ | 580 ○ | 620 ○ | 520 ○ | 470 Δ |
| Insulation defects | Δ | ○ | ○ | x | x | ○ | Δ | ○ | Δ | ○ |

EXAMPLE 3

A polypropylene film (99.0% in II and 99.6% in mmmm) and a capacitor device were obtained as described in Example 1, using the same raw polypropylene as used in Example 1, except that the cast drum temperature was 80° C. and that the air temperature of the air knife was 0° C. The evaluation results of the obtained polypropylene film and capacitor device are shown together in Table 1.

EXAMPLE 4

A polypropylene film (99.0% in II and 99.6% in mmmm) and a capacitor device were obtained as described in Example 1, using the same raw polypropylene as used in Example 1, except that the cast drum temperature was 70° C. and that the air temperature of the air knife was 50° C. The evaluation results of the obtained polypropylene film and capacitor device are shown together in Table 1.

EXAMPLE 5

A polypropylene film (99.0% in II and 99.6% in mmmm) and a capacitor device were obtained as described in Example 1, using the same raw polypropylene as used in Example 1, except that the air knife was not used. During

EXAMPLE 7

Figure 2:
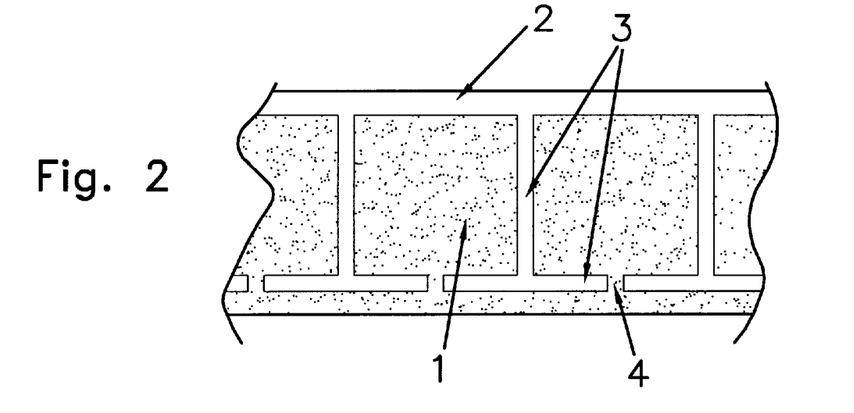
FIG. 2 is a plan view showing a polypropylene film with a metallic layer on one side and with the electrode separated like isles in the machine direction of the film, as another embodiment of the present invention.

The film used in Example 1 was placed in a vacuum metallizer, and with copper as a nucleating metal, zinc (containing 8 wt % of aluminum) was deposited on the corona treated surface to achieve a layer resistance of 4.0 Ω/square. In this case, the metallization was carried out in such a manner that the metallic layer 1 was provided with an insulation groove 2 (margin: 1 mm in the length in the transverse direction) continuous in the machine direction of the film at one edge in the transverse direction of the film according to the oil margin method as shown in FIG. 2 after slitting, and that the metallic layer 1 was provided as a plurality of isles at 30 mm intervals in the machine direction of the film by insulation grooves 3 (1 mm in the width in the machine direction), and connected by a continuous metallic layer (1 mm in width) at the other edge in the transverse direction of the film and bottlenecks 4 (1 mm in both machine and transverse directions). The film was slit to obtain a metallized film of 38 mm in overall width. The obtained film and the metallized film used in Example 1 were used as one pair and wound to form a device, and the end faces of the device were sprayed with a metal. Leads were attached there, to produce a capacitor device of 5 $\mu$F in capacity, and the capacitor device was impregnated with crystalline wax, to obtain a capacitor. The evaluation results of the capacitor are shown together in Table 2.

EXAMPLE 8

A metallized film was produced as described in Example 7, except that the biaxially oriented polypropylene film of Example 2 was used. The obtained film and the metallized film used in Example 2 were used as one pair and wound to form a device, and the end faces of the device were sprayed with a metal. Leads were attached there, to produce a capacitor device of 5 μF in capacity, and the capacitor device was impregnated with crystalline wax, to obtain a capacitor. The evaluation results of the capacitor are shown together in Table 2.

EXAMPLE 9

A metallized film was produced as described in Example 7, except that the biaxially oriented polypropylene film of Example 3 was used. The obtained film and the metallized film used in Example 3 were used as one pair and wound to form a device, and the end faces of the device were sprayed with a metal. Leads were attached there, to produce a capacitor device of 5 μF in capacity, and the obtained capacitor device was impregnated with crystalline wax, to obtain a capacitor. The evaluation results of the capacitor are shown together in Table 2.

EXAMPLE 10

A metallized film was produced as described in Example 7, except that the biaxially oriented polypropylene film of Example 5 was used. The obtained film and the metallized film used in Example 5 were used as one pair and wound to form a device, and the end faces of the device were sprayed with a metal. Leads were attached there to produce a capacitor device of 5 μF in capacity, and the obtained capacitor device was impregnated with crystalline wax, to obtain a capacitor. The evaluation results of the capacitor are shown together in Table 2.

EXAMPLE 11

A metallized film was produced as described in Example 7, except that the biaxially oriented polypropylene film of Example 6 was used. The obtained film and the metallized film used in Example 6 were used as one pair and wound to form a device, and the end faces of the device were sprayed with a metal. Leads were attached there, to produce a capacitor device of 5 μF in capacity, and the obtained capacitor device was impregnated with crystalline wax, to obtain a capacitor. The evaluation results of the capacitor are shown together in Table 2.

EXAMPLE 12

A capacitor was produced as described in Example 7, except that the metallized film used in Example 1 was used as two reels of a pair. The evaluation results of the obtained capacitor are shown together in Table 2.

COMPARATIVE EXAMPLE 6

A metallized film was produced as described in Example 7, except that the biaxially oriented polypropylene film of Comparative Example 1 was used. The obtained film and the metallized film used in Comparative Example 1 were used as one pair and wound to form a device, and the end faces of the device were sprayed with a metal. Leads were attached there to produce a capacitor device of 5 μF in capacity, and the obtained capacitor device was impregnated with crystalline wax, to obtain a capacitor. The evaluation results of the capacitor are shown together in Table 2.

COMPARATIVE EXAMPLE 7

A metallized film was produced as described in Example 7, except that the biaxially oriented polypropylene film of Comparative Example 4 was used. The obtained film and the metallized film used in Comparative Example 4 were used as one pair and wound to form a device, and the end faces of the device were sprayed with a metal. Leads were attached there to produce a capacitor device of 5 μF in capacity, and the obtained capacitor device was impregnated with crystalline wax, to obtain a capacitor. The evaluation results of the capacitor are shown together in Table 2.

EXAMPLE 13

A capacitor device was produced as described in Example 7, except that aluminum was deposited as an internal electrode to achieve a layer resistance of 4.0 0/square. The obtained capacitor device was impregnated with crystalline wax, to obtain a capacitor. The evaluation results of the capacitor are shown together in Table 2.

TABLE 2

|  | Example 7 | Example 8 | Example 9 | Example 10 | Example 11 | Example 12 | Example 13 | Comparative Example 6 | Comparative Example 7 |
|---|---|---|---|---|---|---|---|---|---|
| Weight change rate (%) | 11.5 | 10.5 | 10.8 | 9.7 | 14.1 | 10.5 | 10.5 | 13.5 | 10.5 |
| Dimension change rate (MD, %) | 0.2 | 0.3 | 0.7 | 1.2 | "0.1 | 0.3 | 0.3 | 1.5 | 1.6 |
| Dimension change rate (TD, %) | −0.1 | −0.2 | −3.2 | 0.3 | −1.8 | −0.2 | −0.2 | 0.2 | 0.5 |
| Corona Resistance | ○ | ○ | ○ | Δ | Δ | Δ | Δ | Δ | ○ |
| Self heal properties | ○ | ○ | ○ | ○ | Δ | Δ | ○ | Δ | ○ |
| Dielectric strength of device (V/μm) | 220 ○ | 240 ○ | 230 ○ | 203 ○ | 180 Δ | 230 ○ | 250 ○ | 140 x | 180 Δ |
| Life of device (hours) | 1050 ○ | 1800 ○ | 950 ○ | 880 ○ | 730 ○ | 700 ○ | 490 Δ | 280 x | 200 x |
| Insulation defects Insulation | Δ | 0 | Δ | 0 | Δ | 0 | 0 | 0 | x | film used in Example 6 were used as one pair and wound to form a device, and the end faces of the device were sprayed with a metal. Leads were attached there to produce a

EXAMPLE 14

Polypropylene having 98.8% in II, 99.4% in mmmm and 19 ppm in ash content was supplied to an extruder, molten at a resin temperature of 280° C., and extrusion-molded as a sheet. from a T die, and the sheet was wound around a casting drum of 70° C. using the air knife method at an air temperature of 25° C., to be cooled and solidified, preheated to 135° C., and fed between pairs of rolls kept at 140° C. and different in peripheral speed, to be drawn to 5 times in the machine direction, and immediately cooled to room temperature. In succession, the sheet was introduced into a stenter, preheated to 170° C., drawn to 10 times in the transverse direction at 165° C., and being relaxed by 8% in the transverse direction, treated by corona discharge in air at 30 W·min/m². The ash content and mmmmm of the obtained film were not different from those of the raw polypropylene. The film was set in a vacuum metallizer, and with copper as a nucleating metal, zinc was deposited on the corona treated surface to achieve a layer resistance of 4.0 Ω/square, in such a manner that a metallic layer 1 was formed with an insulation groove 2 (margin: 1 mm in the length in the transverse direction) provided at one edge in the transverse direction. The film was slit, to obtain a metallized film of 38 mm in overall width.

The obtained film was used as two reels of a pair and wound to form a device, and the end faces of the device were sprayed with a metal. Leads were attached there to produce a capacitor device of 5 AF in capacity. The properties of the obtained film and the capacitor device are shown in Table 3. The film was excellent in dielectric properties. The capacitor device was also good in dielectric properties and dielectric loss after application of large current, and was judged to rank Δ in self heal properties.

EXAMPLES 15 TO 17, AND COMPARATIVE EXAMPLES 8 TO 11

As shown in Table 3, biaxially oriented polypropylene films and capacitors different in respective conditions were obtained as described in Example 14.

The properties of the films and capacitors are shown in Table 3.

In the table, the respective abbreviations mean the following:

BDV: Breakdown voltage
DC Direct current

Examples 15 to 17 conform to the present invention. The obtained biaxially oriented polypropylene films were good in dielectric properties, and the capacitors obtained using the films were excellent in dielectric properties, good in dielectric loss after application of large current, and judged to rank Δ in self heal properties.

On the other hand, Comparative Examples 8 to 10 do not conform to the present invention in mmmm. The obtained biaxially oriented polypropylene films were small in dielectric breakdown voltage, and the capacitors obtained using the films were poor in dielectric properties, and furthermore large in heat shrinkage, being inferior also in heat resistance.

Comparative Example 11 does not conform to the present invention in ash content though it conforms to the present invention in mmmm. It was poor in dielectric properties and dielectric loss after application of large current.

EXAMPLES 18 TO 20

The same biaxially oriented polypropylene film as used in Example 14 was used, and a comb-shaped deposition preventive plate was inserted between the metallization source and the base film at the time of metallization, to let the layer resistance change continuously in the transverse direction of th6 film from 2.5 Ω/square to 8 Ω/square. A margin was formed on the electrode metal side of 8 Ω/square. Two pairs of such symmetrical films were processed into a capacitor device as described in Example 14 (Example 18).

In Example 19, the layer resistance was kept constant at 12 Ω/square in the transverse direction of the film. In Example 20, the layer resistance was kept constant at 1.5 Ω/square in the transverse direction of the film. The results are shown in Table 4.

EXAMPLE 21

A capacitor device was produced as described in Example 18, except that the metal used for metallization was aluminum. The results are shown in Table 4.

TABLE 3

| | I I (%) | mmmm (5) | Ash content (ppm) | Ra (μm) on drum side/no n-drum side | d (MMV) (μm) | Crystallinity (%) | BDV (V/μm) | Heat shrinkage (%) | BDV of device DC (V μm) | tan δ after application of large current | Self heal properties |
|---|---|---|---|---|---|---|---|---|---|---|---|
| Example 14 | 98.8 | 99.5 | 19 | 0.08/0.08 | 5.0 | 76 | 640 | 1.9 | 380 | 0.06 | Δ |
| Example 15 | 98.9 | 99.2 | 19 | 0.08/0.08 | 5.o | 75 | 620 | 2.3 | 355 | 0.06 | Δ |
| Example 16 | 98.7 | 99.0 | 21 | 0.08/0.08 | 5.0 | 71 | 615 | 2.4 | 345 | 0.07 | Δ |
| Example 17 | 98.8 | 99.5 | 19 | 0.08/0.08 | 3.5 | 74 | 595 | 2.2 | 340 | 0.07 | Δ |
| Comparative example 8 | 98.0 | 98.5 | 25 | 0.08/0.08 | 5.0 | 70 | 550 | 2.6 | 305 | 0.06 | Δ |
| Comparative example 9 | 98.2 | 98.4 | 20 | 0.08/0.08 | 3.5 | 67 | 450 | 3.0 | 280 | 0.07 | Δ |
| Comparative example 10 | 97.5 | 98.8 | 19 | 0.08/0.08 | 5.0 | 66 | 600 | 2.8 | 310 | 0.07 | Δ |
| Comparative example 11 | 98.2 | 99.2 | 19 | 0.08/0.08 | 5.0 | 72 | 460 | 2.0 | 280 | 0.11 | Δ |

TABLE 4

|  | I I (%) | mmmm (%) | Ash content (ppm) | Ra (μm) on drum side/no n-drum side | d (MMV) (μm) | Maximum layer resistance (Ω/□) | Minimum layer resistance (Ω/□) | BDV of device | tan δ after application of large current | Self heal properties |
|---|---|---|---|---|---|---|---|---|---|---|
| Example 18 | 98.8 | 99.5 | 19 | 0.08/0.08 | 5.0 | 8 | 2.5 | 380 | 0.02 | ○ |
| Example 19 | 98.8 | 99.5 | 19 | 0.08/0.08 | 5.0 | 12 | 12 | 385 | 0.08 | o |
| Example 20 | 98.8 | 99.5 | 19 | 0.08/0.08 | 5.o | 1.5 | 1.5 | 380 | 0.01 | x |
| Example 21 | 98.8 | 99.5 | 19 | 0.08/0.08 | 5/O | 8 | 2.5 | 380 | 0.01 | ⊚ |

All the capacitor devices showed excellent dielectric breakdown voltage. Especially the capacitor device of Example 18 was excellent also in the dielectric loss after application of large current and self heal properties, being very excellent as a capacitor for a high frequency circuit. The capacitor device of Example 19 was large in layer resistance, and rather higher in the dielectric loss after application of large current, compared to Example 18. The capacitor device of Example 20 was low in layer resistance, and rather inferior in self heal properties compared to Example 18. The capacitor device of Example 21 was better in self heal properties compared to Example 18, being most excellent as a capacitor for a high frequency circuit.

EXAMPLE 22

The raw polypropylene used in Example 2 was used to obtain A 5.0 μm thick biaxially oriented polypropylene film as described in Example 1. The obtained film was set in a vacuum metallizer, and aluminum was deposited on the corona treated surface, with an insulation groove 2 (margin: 2.5 mm in the length in the transverse direction) provided at one edge in the transverse direction of the metallic layer 1 as shown in FIG. 1 to achieve a layer resistance of 8 Ω/square. The metallized film was slit, to obtain a metallized film of 100 mm in overall width.

Two reels of the obtained metallized film were used as one pair and wound to form a device, and the end faces of the device were sprayed with a metal. Leads were attached there to produce a capacitor device, and the obtained capacitor device was sealed in a plastic case-together with an epoxy resin used as a filler. In this way, 10 capacitors were produced. The electrostatic capacity of the capacitors was 60 μF.

The capacitors were impressed at a DC voltage of 1000 V in an atmospheric temperature of 85° C. for 100 hours, and the number of capacitors which suffered any dielectric breakdown was counted.

The capacitors which did not suffer any dielectric breakdown in the above test were unwound to obtain metallized polypropylene films, and the number of insulation defects of each metallized polypropylene film (IF) was counted, while the number of insulation defects of a metallized polypropylene film not energized (IFO) was also counted, for examining the increase of insulation defects after impression. To count the insulation defects, a metallized polypropylene film as a specimen was held between a metallized film used as an electrode for testing and a copper flat sheet, and a DC voltage of 1.25 kV was applied for 1 minute, to count the number of breakdowns (number of defects). The area of the specimen was 0.2 m²

The properties of the obtained film (the ash content and mmmm of the obtained film were not different from those of the raw polypropylene) and capacitor are shown in Table 5.

EXAMPLE 23

A capacitor was produced as described in Example 22, except that the raw polypropylene used in Example 2 contained 1000 ppm of tetrakis [methylene-3 (3,5-di-t-butyl4-hydroxyphenyl) propionate] methane as an antioxidant.

The properties of the obtained film (the ash-content and mmmm of the obtained film were not different from those of the raw polypropylene) and capacitor are shown in Table 5.

EXAMPLE 24

A capacitor was produced as described in Example 22, except that the raw polypropylene used in Example 2 contained 3000 ppm of tetrakis [methylene-3(3,5-di-t-butyl4-hydroxyphenyl) propionate methane as an antioxidant.

The properties of the obtained film (the ash content and mmmm of the obtained film were not different from those of the raw polypropylene) and capacitor are shown in Table 5.

EXAMPLE 25

A capacitor was produced as described in Example 22, except that 3000 ppm of 1,3,5-trimethyl-2,4,6-tris (3,5-di-t-butyl-4-hydroxybenzyl) benzene was added instead of tetrakis [methylene-3 (3,5-di-t-butyl-4hydroxyphenyl) propionate] methane.

The properties of the obtained film (the ash content and mmmm of the obtained film were not different from those of the raw polypropylene) and capacitor are shown in Table 5.

EXAMPLE 26

Figure 3:
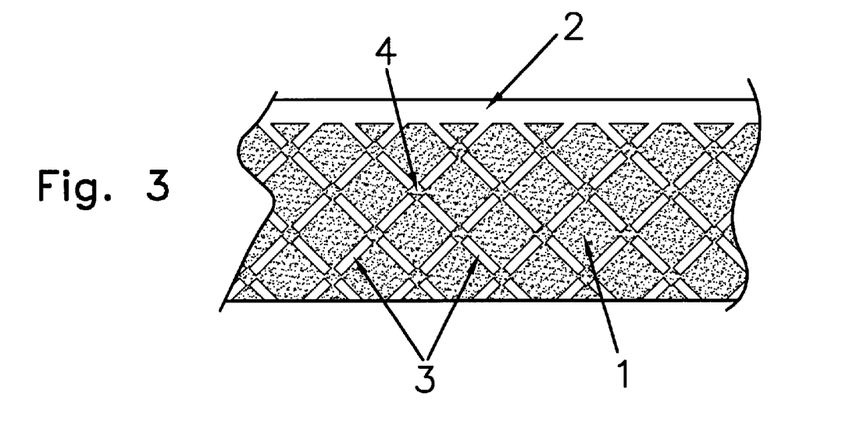
FIG. 3 is a plan view showing a polypropylene film with a metallic layer on one side and with the electrode having a plurality of safety function portions placed along the transverse direction of the film.

The biaxially oriented polypropylene film used in Example 25 was placed in a vacuum metallizer, and aluminum was deposited on the corona treated surface to achieve a layer resistance of 8 Ω/square. In this case, a metallic layer 1 was formed with an insulation groove 2 (margin: 2.5 mm in the length in the transverse direction) continuous in the machine direction of the film at one edge in the transverse direction of the film by the oil margin method as shown in FIG. 3 after slitting, and the metallic layer 1 had a plurality of 1 mm wide bottlenecks 4 with safety function formed in the transverse direction of the film by intermittent 20 mm long insulation grooves 3 (1 mm in width) formed at an inclination angle of 45° in the transverse direction.

Two reels of the obtained metallized film were used as a pair and wound to form a device, and the end faces of the device were sprayed with a metal. Leads were attached there to produce a capacitor device, and the obtained capacitor device was sealed in a plastic case together with an epoxy resin used as a filler. In this way, 10 capacitors were produced. The electrostatic capacity of the capacitors was 60 μF.

The properties of the obtained metallized film and capacitors are shown in Table 5.

COMPARATIVE EXAMPLE 12

Capacitors were produced as described in Example 22, except that the raw polypropylene of Comparative Example 3 was used.

The properties of the obtained film (the ash content and mmmm of the obtained film were not different from those of the raw polypropylene) and capacitors are shown in table 5.

film undergoes a 5 to 12% weight change when immersed in dodecylbenzene.

TABLE 5

| | I I (%) | mmmm (5) | Ra (μm) on drum side/no n-drum side | d (MMV) (μm) | Oxygen absorption induction time (min) | IR₁ (ΩF) | IR₂ (ΩF) | IR1/I_{R2} | Number of dielectric breakdowns (per capacitor) | IFo | IF |
|---|---|---|---|---|---|---|---|---|---|---|---|
| Example 22 | 99.1 | 99.7 | 0.08/0.08 | 5.0 | 120 | 280000 | 230 | 1217 | 2 | 3 | 4 |
| Example 23 | 99.1 | 99.7 | 0.10/0.10 | 5.0 | 15 | 350000 | 5800 | 60 | 2 | 2 | 8 |
| Example 24 | 99.1 | 99.7 | 0.09/0.09 | 5.0 | 80 | 320000 | 900 | 345 | 0 | 2 | |
| Example 25 | 99.1 | 99.7 | 0.08/0.08 | 5.0 | 40 | 260000 | 7500 | 340 | 1 | 0 | 0 |
| Example 26 | 98.4 | 99.7 | 0.08/0.08 | 5.0 | 40 | 260000 | 7500 | 305 | 0 | 0 | 0 |
| Comparative example 12 | 98.2 | 98.9 | 0.15/0.20 | 5.0 | 70 | 120000 | 80 | 280 | 9 | 10 | Because of too many defects, they could not be counted. |

INDUSTRIAL APPLICABILITY

The present invention provides a biaxially oriented polypropylene film excellent in heat.resistance and dielectric properties, less insulation defects, and excellent impregnation of insulating oil into the clearance between film layers and swelling resistance when immersed in the insulating oil. It also provides a capacitor having excellent heat resistance, dielectric properties, corona resistance, long-term heat durability and electric current resistance, using the polypropylene film as dielectric.

We claim:

1. A biaxially oriented polypropylene film having:
an isotacticity of 98 to 99.5%; an isotactic pentad fraction of 99% or more;
an ash content of 30 ppm or less; and
the center line average surface roughnesses on both sides of the polypropylene film of 0.01 to 0.4 μm; and
wherein the film thickness is measurable geometrically or by weight, with different results, and wherein said difference (Δd) according to said film thickness measuring methods defined, by the following formula, is 0.01 to 0.5 μm:

$$\Delta d = d(MMV) - d(WMV),$$

where d(MMV) is the thickness of the film (μm) measured by a micrometer, and d(WMV) is the film thickness measured by weight (μm).

2. A capacitor comprising a biaxially oriented polypropylene film defined in claim 1 as a dielectric.

3. A capacitor comprising a biaxially oriented polypropylene film defamed in claim 2 as a dielectric, wherein a metallic layer is formed on said film and constitutes an internal electrode on at least one side of said film.

4. A capacitor of claim 3 defined, wherein said metallic layer has a resistance value of 2 Ω/square to 10 Ω/square.

5. A capacitor of claim 3, wherein said metallic layer is mainly aluminum or zinc.

6. A capacitor for use in a heat resistant AC circuit, defined in claim 3, said film comprising a multiplicity of layers having clearances between them, wherein said clearances between said film layers are impregnated with an insulating oil.

7. A capacitor for use in a heat resistant AC circuit, according to claim 6, wherein said dielectric polypropylene 8. A capacitor for use in a heat resistant AC circuit, according to claim 6, wherein said metallic layer constitutes an internal electrode and wherein said metallic layer comprises mainly zinc.

9. A capacitor for use in a heat resistant AC circuit as defined in claim 6, wherein said film has a length direction and a width direction, wherein said metallic layer is formed with an insulation groove provided continuously along the length direction of said film, at one edge in the width direction of the film and is arranged as an internal electrode having an internal electrode portion and wherein said internal electrode is structured, in the event of discharge breakdown at a breakdown point, to cause the current that flows when said film suffers said dielectric breakdown to electrically insulate said internal electrode portion around said discharge breakdown point from the other internal electrode portions that are free from such discharge.

10. A capacitor for use in a heat resistant AC circuit, as defined in claim 9, wherein said metallic layer is separated into a plurality of isles in the length direction of the film by insulation grooves, and is connected through bottlenecks with said metallic layer continuous at the other edge in the width direction of said film.

11. A capacitor for a high frequency circuit, as defined in claim 3, wherein said film has a dielectric loss, after impression with 100 kHz and 10 A for 3 minutes, of 0.05% or less.

12. A capacitor for a high frequency circuit, according to claim 11, wherein the resistance of said metallic layer continuously changes in the width direction of the film in a range from minimum 2 Ω/square to maximum 10 Ω/square.

13. A biaxially oriented polypropylene film, characterized by being 98 to 99.5% in isotacticity, 99% or more in isotactic pentad fraction, 30 ppm or less is ash content and 0.01 to 0.4 μm in the center line average surface roughnesses on both sides, which has an oxygen absorption induction time of 20 minutes or more, an insulation resistance IR1 at 20° C. of $1.5 \times 10^5$ ΩF or more, and a value of IR1/IR2, where IR2 is the insulation resistance at 100° C., of 700 or less.

14. A capacitor for use in a heat resistant DC circuit, comprising the polypropylene film defamed in claim 13 wherein a metallic layer is provided as an internal electrode at least on one side of the film.

15. A capacitor for use in a heat resistant DC circuit according to claim 14, comprising the polypropylene film as a dielectric, wherein the resistance of said metallic layer is 2 Ω/square to 10 Ω/square.

16. A capacitor for a heat resistant DC circuit according to claim 14 comprising the polypropylene film as a dielectric, wherein a main metal comprises the internal electrode, which is aluminum or zinc.

17. A capacitor for a heat resistant DC circuit according to claim 14, comprising the polypropylene film as a dielectric, having the metallic layer as the internal electrode formed with an insulation groove provided continuously in the length direction of the film at one edge in the width direction of the film, wherein said metallic layer of said internal electrode is formed with the insulation groove.

18. A capacitor for a heat resistant DC circuit according to claim 17, comprising the polypropylene film, wherein said metallic layer acting as the internal electrode is formed with the insulation groove provided continuously in the length direction of the film at one edge in the width direction of the film, and the internal electrode is provided with a plurality of safety functions in the width direction of the film.

19. A polypropylene film according to claim 13, containing 0.05–0.35 wt. % of 1,3,5-trimethyl-2,4,6-tris(3,5-di-t-butyl-4-hydroxybenzyl) benzene and/or tetrakis methane as an antioxidant.

* * * * *

UNITED STATES PATENT AND TRADEMARK OFFICE
CERTIFICATE OF CORRECTION

PATENT NO.: 6,094,337
DATED: July 25, 2000
INVENTOR(S): Ueda et al

Page 1 of 2

It is certified that error appears in the above-identified patent and that said Letters Patent is hereby corrected as shown below:

On the Title page, at "[54]", please delete "MADE BY" in the title.

In Column 1, at line 8, please change "hear" to --heat--.

In Column 3, at line 4, please change "bot" to --both--.

In Column 13, at line 64, please change "toe" to --to be--.

In Column 14, at line 36, please change "MNZ" to --MHz-- ; and at line 50, please change "MHZ" to --MHz--.

In Column 23, at Table 3, at the subheading "Ash content (ppm)", at "Comparative Example 11", please change "19" to --38--; and in the subheading "d (MMV)", at Example 15, please change "5.°" to --5.0--.

In Column 25, at Table 4, at subheading "d (MMV)", at Example 20, please change "5.°" to --5.0--, and at Example 21, please change "5/0" to --5.0--.

UNITED STATES PATENT AND TRADEMARK OFFICE
CERTIFICATE OF CORRECTION

PATENT NO.: 6,094,337
DATED: July 25, 2000
INVENTOR(S): Ueda et al

It is certified that error appears in the above-identified patent and that said Letters Patent is hereby corrected as shown below:

In Column 27, at Table 5, at the Subheading "II", at Example 26, please change "98.4" to --99.1--, at Comparative Example 12, please change "98.2" to --98.4--;

at the subheading "IR1/$I_{R2}$", please change "345" to --355--, "340" to --35--, "305" to --35--, and "280" to --1500--;

at the subheading "Number of dielectric breakdowns (per capacitor)", at Example 24, please change "0" to --1--;

at the subheading "Ifo", at Example "24", please change "2" to --0--; and at the subheading "IF", at Example 24, please insert --2--.

Signed and Sealed this

Twenty-fourth Day of April, 2001

Attest:

NICHOLAS P. GODICI

Attesting Officer

Acting Director of the United States Patent and Trademark Office